US010771452B2

(12) United States Patent
Dennis et al.

(10) Patent No.: US 10,771,452 B2
(45) Date of Patent: Sep. 8, 2020

(54) AUTONOMOUS CONFIGURATION OF EMAIL CLIENTS DURING EMAIL SERVER MIGRATION

(71) Applicant: SkyKick, Inc., Seattle, WA (US)

(72) Inventors: John Dennis, Oakland, CA (US); Evan Richman, Seattle, WA (US); Todd Schwartz, Seattle, WA (US); Bradley Younge, Denver, CO (US); Trent Robert Schwartz, Seattle, WA (US); Robert P. Karaban, Woodinville, WA (US); Richard James Tett, Plano, TX (US); Bernard Clark, Seattle, WA (US); Christopher Rayner, Seattle, WA (US)

(73) Assignee: SKYKICK, INC., Seattle, WA (US)

( * ) Notice: Subject to any disclaimer, the term of this patent is extended or adjusted under 35 U.S.C. 154(b) by 341 days.

(21) Appl. No.: 15/061,945

(22) Filed: Mar. 4, 2016

(65) Prior Publication Data
US 2016/0261584 A1 Sep. 8, 2016

Related U.S. Application Data

(60) Provisional application No. 62/128,426, filed on Mar. 4, 2015.

(51) Int. Cl.
*G06F 15/16* (2006.01)
*H04L 29/06* (2006.01)
(Continued)

(52) U.S. Cl.
CPC ........ *H04L 63/083* (2013.01); *H04L 41/0886* (2013.01); *H04L 51/22* (2013.01); *H04L 67/1095* (2013.01); *H04L 67/148* (2013.01)

(58) Field of Classification Search
USPC ....... 709/202, 203, 206, 217, 223, 201, 219, 709/224, 226, 228, 230, 232, 238;
(Continued)

(56) References Cited

U.S. PATENT DOCUMENTS

| 4,827,478 A | 5/1989 | Chan |
| 6,434,682 B1 | 8/2002 | Ashton et al. |

(Continued)

FOREIGN PATENT DOCUMENTS

| EP | 1215590 B1 | 5/2007 |
| WO | 2013123097 A1 | 8/2013 |
| WO | 2015006308 A1 | 1/2015 |

OTHER PUBLICATIONS

U.S. Appl. No. 14/814,424, Final Office Action dated Oct. 6, 2016, 28 pages.

(Continued)

*Primary Examiner* — Quang N Nguyen
(74) *Attorney, Agent, or Firm* — Kilpatrick Townsend & Stockton LLP

(57) ABSTRACT

Systems and methods are provided for automatically configuring an email client during a migration process. An client-side assistant can be deployed to an end-user's computer via a migration platform. After being deployed to a particular client computer, the client-side assistant can be configured to obtain user information to identify the end-user associated with the client computer. After identifying the end-user, destination system information regarding the end-user can be pushed to client computer for inclusion in new configuration information for the email client. Before generating the new configuration information, user credential for logging into the source system can be obtained. The client-side assistant can be configured to cause the destination system to confirm this credential. After generating the new configuration information, the client-side assistant can (Continued)

instruct the client-side assistant to use the new configuration information to at a specific time and date.

16 Claims, 7 Drawing Sheets

(51) Int. Cl.
 *H04L 12/58* (2006.01)
 *H04L 29/08* (2006.01)
 *H04L 12/24* (2006.01)
(58) Field of Classification Search
 USPC .............. 707/693; 714/20; 726/1, 30; 705/3
 See application file for complete search history.

(56) References Cited

U.S. PATENT DOCUMENTS

| | | | |
|---|---|---|---|
| 7,284,045 B1 | 10/2007 | Marl et al. | |
| 7,426,181 B1 | 9/2008 | Feroz et al. | |
| 7,587,455 B2 | 9/2009 | Czeczulin | |
| 7,603,419 B2 | 10/2009 | Gardner et al. | |
| 7,647,411 B1 | 1/2010 | Schiavone et al. | |
| 7,761,609 B1 | 7/2010 | Srinivasan et al. | |
| 7,809,598 B2 | 10/2010 | DelGaudio et al. | |
| 7,953,707 B2 | 5/2011 | Hamel et al. | |
| 8,224,924 B2 | 7/2012 | Andersen et al. | |
| 8,285,817 B1 | 10/2012 | Balasubramanian et al. | |
| 8,447,826 B1 | 5/2013 | Manmohan et al. | |
| 9,207,873 B2 | 12/2015 | Nelson | |
| 9,582,524 B1 | 2/2017 | Murali et al. | |
| 9,729,488 B2* | 8/2017 | Pouzin | H04L 51/22 |
| 10,592,483 B2 | 3/2020 | Dennis et al. | |
| 2002/0188732 A1 | 12/2002 | Buckman et al. | |
| 2004/0236749 A1 | 11/2004 | Cortright et al. | |
| 2005/0086457 A1 | 4/2005 | Hohman | |
| 2005/0192992 A1 | 9/2005 | Reed et al. | |
| 2005/0289182 A1 | 12/2005 | Pandian et al. | |
| 2007/0061393 A1* | 3/2007 | Moore | H04L 63/20 709/201 |
| 2007/0073818 A1 | 3/2007 | Gardner et al. | |
| 2007/0226304 A1* | 9/2007 | Virk | G06Q 10/107 709/203 |
| 2007/0271341 A1 | 11/2007 | Kumar et al. | |
| 2008/0028100 A1 | 1/2008 | Adelman et al. | |
| 2008/0109448 A1 | 5/2008 | Aboel-Nil et al. | |
| 2008/0201433 A1 | 8/2008 | McDonald | |
| 2008/0256321 A1 | 10/2008 | Armstrong et al. | |
| 2008/0307178 A1 | 12/2008 | Agombar et al. | |
| 2009/0187632 A1 | 7/2009 | Alarid et al. | |
| 2009/0327192 A1 | 12/2009 | Galgali et al. | |
| 2010/0082777 A1 | 4/2010 | Montgomery et al. | |
| 2010/0172378 A1 | 7/2010 | Arye et al. | |
| 2010/0239255 A1 | 9/2010 | Ikeda et al. | |
| 2011/0004629 A1 | 1/2011 | Thorat et al. | |
| 2011/0264748 A1* | 10/2011 | Pouzin | G06F 9/5011 709/206 |
| 2011/0295925 A1* | 12/2011 | Lieblich | G06F 9/5027 709/223 |
| 2012/0143894 A1 | 6/2012 | Ferguson et al. | |
| 2012/0158896 A1 | 6/2012 | Tamiya | |
| 2012/0185926 A1* | 7/2012 | Topatan | H04L 51/22 709/217 |
| 2012/0303814 A1 | 11/2012 | Ferris | |
| 2013/0104251 A1* | 4/2013 | Moore | G06F 21/602 726/30 |
| 2013/0212200 A1* | 8/2013 | Dennis | H04L 51/22 709/206 |
| 2013/0262638 A1 | 10/2013 | Kumarasamy et al. | |
| 2013/0291060 A1* | 10/2013 | Moore | G06F 16/9535 726/1 |
| 2013/0325800 A1 | 12/2013 | Halevy et al. | |
| 2015/0212897 A1* | 7/2015 | Kottomtharayil | G06F 16/128 714/20 |
| 2015/0331774 A1 | 11/2015 | Slik | |
| 2015/0373106 A1 | 12/2015 | Dennis et al. | |
| 2016/0004820 A1* | 1/2016 | Moore | G06F 21/604 705/3 |
| 2016/0134571 A1* | 5/2016 | Lindley | H04L 51/08 709/206 |
| 2016/0253339 A1* | 9/2016 | Ambrose | G06F 3/0608 707/693 |
| 2016/0292152 A1 | 10/2016 | Dennis et al. | |

OTHER PUBLICATIONS

U.S. Appl. No. 14/814,424, Non-Final Office Action dated Jun. 6, 2016, 14 pages.
U.S. Appl. No. 14/814,424, Restriction Requirement dated Dec. 31, 2015, 10 pages.
Henseler, Network-based filtering for large email collections in E-Discovery, Journal Artificial Intelligence and Law, vol. 18 Issue 4, Dec. 23, 2010, pp. 413-430.
Nadhan, A Strategic Approach to Data Transfer Methods, Available online at: https://msdn.microsoft.com/en-us/library/ aa 480064. aspx, 2016, pp. 1-16.
International Application No. PCT/US2013/026000, International Search Report and Written Opinion dated Jun. 21, 2013, 11 pages.
Stackoverflow, 403 Forbidden vs 401 Unauthorized HTTP responses, Jul. 21, 2010, pp. 1-7.
Zhou, Mining organizational emails for social networks with application to Enron corpus, ProQuest LLC, Jul. 2008, pp. 1-180.
U.S. Appl. No. 15/096,187 , "Non-Final Office Action", dated Dec. 27, 2018, 15 pages.
Final Office Action for U.S. Appl. No. 15/096,187 dated Aug. 7, 2019, 7 pages.
Non-Final Office Action for U.S. Appl. No. 16/058,738 dated Oct. 29, 2019, 13 pages.
Notice of Allowance for U.S. Appl. No. 15/096,187 dated Nov. 5, 2019, 10 pages.
U.S. Appl. No. 16/058,738 , "Final Office Action", dated Apr. 15, 2020, 14 pages.

* cited by examiner

AUTONOMOUS CONFIGURATION OF EMAIL CLIENTS DURING EMAIL SERVER MIGRATION

CROSS-REFERENCES TO RELATED APPLICATIONS

This application claims priority to U.S. Provisional Application Ser. No. 62/128,426 filed on Mar. 4, 2015, which are hereby incorporated by reference in its entirety.

This application relates to U.S. Patent Application Publication No. US2013/0212200A1, with title, "MIGRATION PROJECT AUTOMATION, E.G., AUTOMATED SELLING, PLANNING, MIGRATION AND CONFIGURATION OF EMAIL SYSTEMS", filed Feb. 13, 2013, which is hereby incorporated by reference in its entirety.

BACKGROUND

The present disclosure generally relates to achieving automatic configuration of an email client on a client computing system and to facilitating the email client to migrate from a source system to a destination system with minimal or without intervention from an end-user.

Migrating a single email system from one computing system to another can be a daunting task, requiring a significant amount of time for planning and execution and significant amount of resources. A typical email system infrastructure may include a variety of server computers residing in different locations with separate server configuration settings, and end-users' client computers having email client applications installed thereon. The email client applications can enable the end-users to compose emails, create and manage calendar events, contacts, and tasks, and/or to perform any other tasks. Migrating email systems typically involve configuring client email applications to connect to a new email system instead of an old email system. Traditionally, end-users intervention were required during the migration process. For example, the end-user would be required to update his/her email client application settings by providing a reachable address of the new email system, a system type of the new email system, his/her username/password for the new system , and/or any other settings. However, many of the email system settings are not intuitive and the end-users can be inundated with rarely used technical terms along this process, not to mention mistakes were often made.

BRIEF SUMMARY

Embodiments can provide systems, methods, and computer-readable medium products for automatically configuring (including re-configuring) an electronic mail client application on an end-user's computer system for migrating the electronic mail client application from a source system to a destination system. The automatic configuration can include deploying a client-side assistant application to the end-user's computer system. Once deployed, the client-side assistant application can be configured to obtain user information regarding the end user. The user information can be sent to a remote system, e.g., a migration platform system or an ordering system, for user identification and/or authentication. After having been identified and authenticated, the end-user's information regarding the destination system can be sent to the client-side assistant application from the remote system. The end user's information regarding the destination system can include information indicating an electronic mail address of the end-user at the destination system.

Before starting to configure the electronic mail client application, the client-side assistant can be configured to discover a credential of the end-user stored on the end-user's computer system. The to-be-discovered credential can include a username/password pair for the end-user to log into the source system. Once having discovered the credential, the client-side assistant application can cause the destination system to validate the credential. The validation can ensure that the end-user and/or the end-user's computer is trusted before generating configuration information to configure the end-user's electronic mail client application for migration to the destination system.

In some examples, the validation may include logging into the source system or destination system using the discovered credential. User accounts on the source and destination systems can be synchronized for an entity (e.g., a business, or a company) before migrating electronic mail client applications of the end-users in the entity. In this way, end-user intervention during the electronic mail system migration for the entity can be reduced. Accordingly, the end user's credential stored on the end-user's computer for the source system can be used to validate whether the end-user has an account on the destination system using a credential synchronized from the source system.

Once having validated the discovered credential, the client-side assistant application can be configured to generate configuration information for connecting the electronic mail client application to the destination system. The configuration information can include information indicating the end user's electronic mail address at the destination system, the credential or a location for retrieving the credential for logging into the destination system, one or more electronic mail preference such as a signature for the end user, incoming notification frequencies and/or any other preferences, and/or any other type of configuration information. The client-side assistant application can be configured to effectuate configuring the electronic mail client application by having the electronic mail client application use the newly generated configuration information at a specific time and date.

Other embodiments are directed to systems, portable consumer devices, and computer readable media associated with methods described herein.

BRIEF DESCRIPTION OF THE DRAWINGS

Some embodiments of the inventive subject matter are illustrated herein by way of example, and not limitation, in the FIG's. of the accompanying drawings, in which.

TERMS

Figure 1:
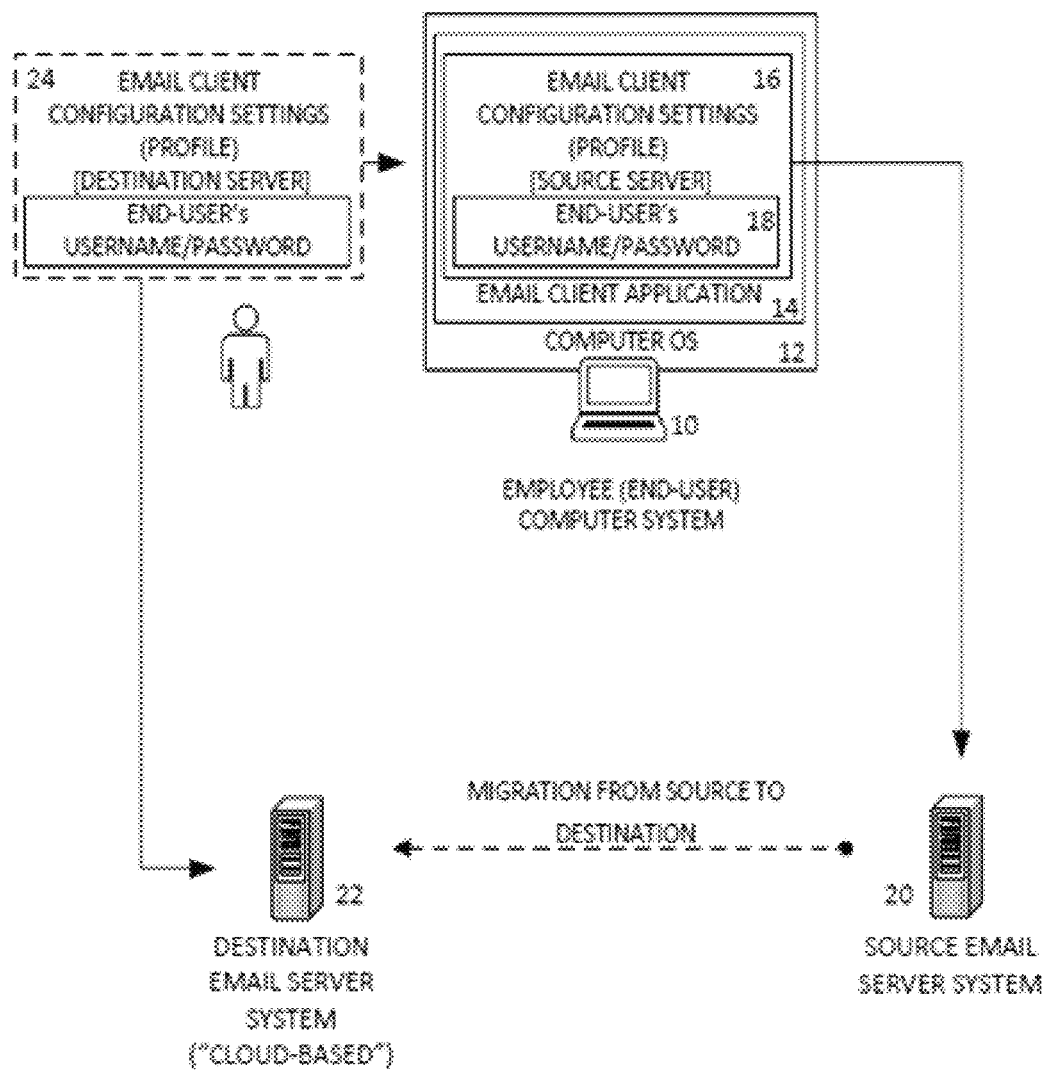
FIG. 1 is a block diagram illustrating an example of a client computer system having an email client application with configuration settings (e.g., a profile) that are to be modified as part of an email server system migration.

A client-side assistant is a computer program that can be deployed and executed on a client computer. The client-side assistant can be configured to automatically perform various tasks to aid the migration of electronic mail systems from a source system to a destination system on the client side. The tasks performed by the client-side assistant can include obtaining user information, discovering user credentials, generating configuration information to configure an electronic mail client on the client computer, effectuating automatic and persistent connection between the electronic mail client and the destination system. In various embodiments, the client-side assistant can be a stand-alone and self-contained application module, a driver component, a library file (e.g., DLL), a firmware, an APP executing on a mobile platform, or any other form of computer program.

An electronic mail server (email server herein) is a system that facilitates exchanging digital messages between users. Examples of an email server can include Microsoft Exchange Server®, Lotus Notes® server, Gmail server, Unix mail server, just to name a few. An electronic mail client application (email client herein) is a computer program executed on the client computer of a user to enable a user to send and receive digital messages or emails. Emails are stored in the user's mailbox on the remote email server until the user's email client requests them to be downloaded to the user's computer. The email client can be set up to connect to multiple mailboxes at the same time and to request the download of emails either automatically, such as at pre-set intervals, or the request can be manually initiated by the user. The email client can contain a user interface to display and edit text. The email client can be set up automatically to connect to the user's mail server. Examples of an email client can include Microsoft Outlook®, Lotus Notes client, Unix Pine, Google web mail client, just to name a few.

A customer as used herein may be referred to an administrator, a moderator, a provider or any other personnel that facilitates email migration for an entity such as a business, a school, a government function and/or any other type(s) of personnel. An end-user as used herein may be referred to a user associated with a client computer. Examples of an end-user can include an employee of a business, a student of a school, a staff member in a government function, a medical personnel in a hospital, just to name a few.

An order key may be referred to as a string of characters issued by the an order management system, which can be configured to manage orders for migrating email systems for a customer. The order key can be associated with a specific order for an end-user in the order management system. A request containing a valid user name and order key combination (where the user name is a member of the list of users on the order) can be used by a migration platform to identify the user to a specified user record.

DETAILED DESCRIPTION

The present disclosure describes methods, systems and computer-readable medium products for automatically configuring an email client on an end-user's computer system for migrating the email client from a source system to a destination system. The automatic configuration can include deploying a client-side assistant to the end-user's computer system. Once deployed, the client-side assistant can be executed on the end-user's computer system and can be configured to obtain user information regarding the end-user. The obtained user information regarding the end-user can be sent by the client-side assistant to a remote system for user identification and/or verification. After having been identified and verified, destination system information regarding the end-user can be sent to the client-side assistant from the remote system.

The destination system information regarding the end-user can include account information for the end-user on the destination system, such as a username, an email address, and/or any other account information for the end-user on the destination system. Before starting to configure the electronic mail client application on end-user's computer system, the client-side assistant can be configured to discover a credential for the end-user to log into source system that is stored on the end-user's computer system. The client-side assistant can cause the destination system or the source system to confirm such a credential. The validation can ensure that the end-user and/or the end-user's computer system is trusted before generating configuration information to configure the end-user's electronic mail client application for migration to the destination system.

An overview of email migration is provided in section 1. Various operations involving the client-side assistant are described in section 2. An exemplary computer system for implementing the present disclosure is provided in section 3.

I. Overview of E-Mail Migration

FIG. 1 illustrates a system by which email system migration is facilitated. As shown, the email system can have one or more of an end-user's computer system 10 having a computer operating system (OS) 12 (e.g., Microsoft Windows®), and an email client application 14 (e.g., Microsoft® Outlook). Typically, a given email client application 14, such as Microsoft® Outlook, has an associated collection of configuration settings, often stored and presented together in what is referred to as a profile 16. The configuration settings or profile 16 typically include information that is necessary to enable the email client application 14 to communicate with the email server 20 in the email system, and thus allow a given end-user to send and receive email. For example, the information can include the given end-user's email system authentication credentials (e.g., username, email address and/or password 18), the address of the email server, the communications port of the email server to which communications are to be directed, specific security protocols to be used in communicating with the email server, as well as any other information.

During an email system migration, when a source email server system 20 is being migrated to a (new) destination email server system 22, the configuration settings or profile 16 of the end-user's email client application 14 must be updated to reflect configuration settings that are consistent and operable with the destination email server system 22. In the system shown in FIG. 1, this is accomplished by manually creating a new profile 24 with configuration settings that correspond with the destination email server system 22. Furthermore, timing is critical. For example, subsequent to the migration cutover—that is, the moment when the (new) destination email server system is activated to replace the source email server system—the end-user will not be able to send and receive email unless and until he or she has an updated profile with the proper configuration settings for the new email server.

While it is possible to manually update the configuration settings, relying on a less than tech savvy end-user to do so is neither wise nor realistic. Because there may be hundreds or even thousands of end-users within any particular organization, and thus a great number of end-user computer systems to configure, having one or more information technology (I.T.) administrators or experts perform the configuration manually for each end-user may result in hundreds or even thousands of man-hours, which translates to a significant expense to the organization for which the email system migration is being undertaken.

As improvement over the system shown in FIG. 1, the migration process can be streamlined by enabling a customer, e.g., an administrator, to generate a migration plan and deploy client-side assistant to end-user's computers. The client-side assistant, once deployed and executed on the end-user's computer system, can be configured to automatically configure email clients on end-user's computers. The customer can be facilitated to use a web-based migration planner to generate the migration plan. As part of this improved migration process and consistent with some embodiments of the present invention, the customer can uses the web-based planner to configure remote deployment of a client-side assistant to aid in the configuring the end-user's email client (e.g., Microsoft Outlook). For example, the client-side assistant can be configured to obtain user information for user identification and verification, and to generate configuration information, e.g., a profile, for the end-user's email client to automatically and persistently connect to the destination system. The client-side assistant can be configured to instruct the email client to use configuration information at a specific time and date (e.g., at the cutover). This may provide a streamlined email migration from the end-user's point of view and requires little or no intervention from the end-user. Other aspects and advantages of the various embodiments of the inventive subject matter will be apparent from the description of the figures that follow.

Various techniques described herein can be achieved, at least with some embodiments, via a combination of hardware and software components or modules that are part of, or otherwise integrated with, a cloud-based migration platform and service that enables one to generate and execute migration plans for migrating email server systems. One such tool for migrating email systems described in U.S. Patent Application Publication No. US2013/0212200A1, with title, "Migration Project Automation, E.G., Automated Selling, Planning, Migration And Configuration Of Email Systems," which is incorporated by reference in its entirety. The improved migration process in accordance with the disclosure can be based on such a migration tool and can be generally divided into server side operations and client side operations. Details of the improved migration process in accordance with the disclosure are provided below.

II. Migration with Client-Side Assistant

The improved migration process can begin with email system information discovery and migration planning. These operations can be performed by a migration platform server system accessible to the customer, e.g., an administrator. The customer can provide certain information regarding the migration to the migration platform server system, which can discover the source and destination systems, gather system information to facilitate the intended migration, analyze the intended migration, generate one or more reports and/or alerts regarding the migration and/or perform any other server side operations. Details of the server side operations that can be performed by the migration platform server system are provided below.

A. Server Side Operations With A Migration Platform

Figure 2:
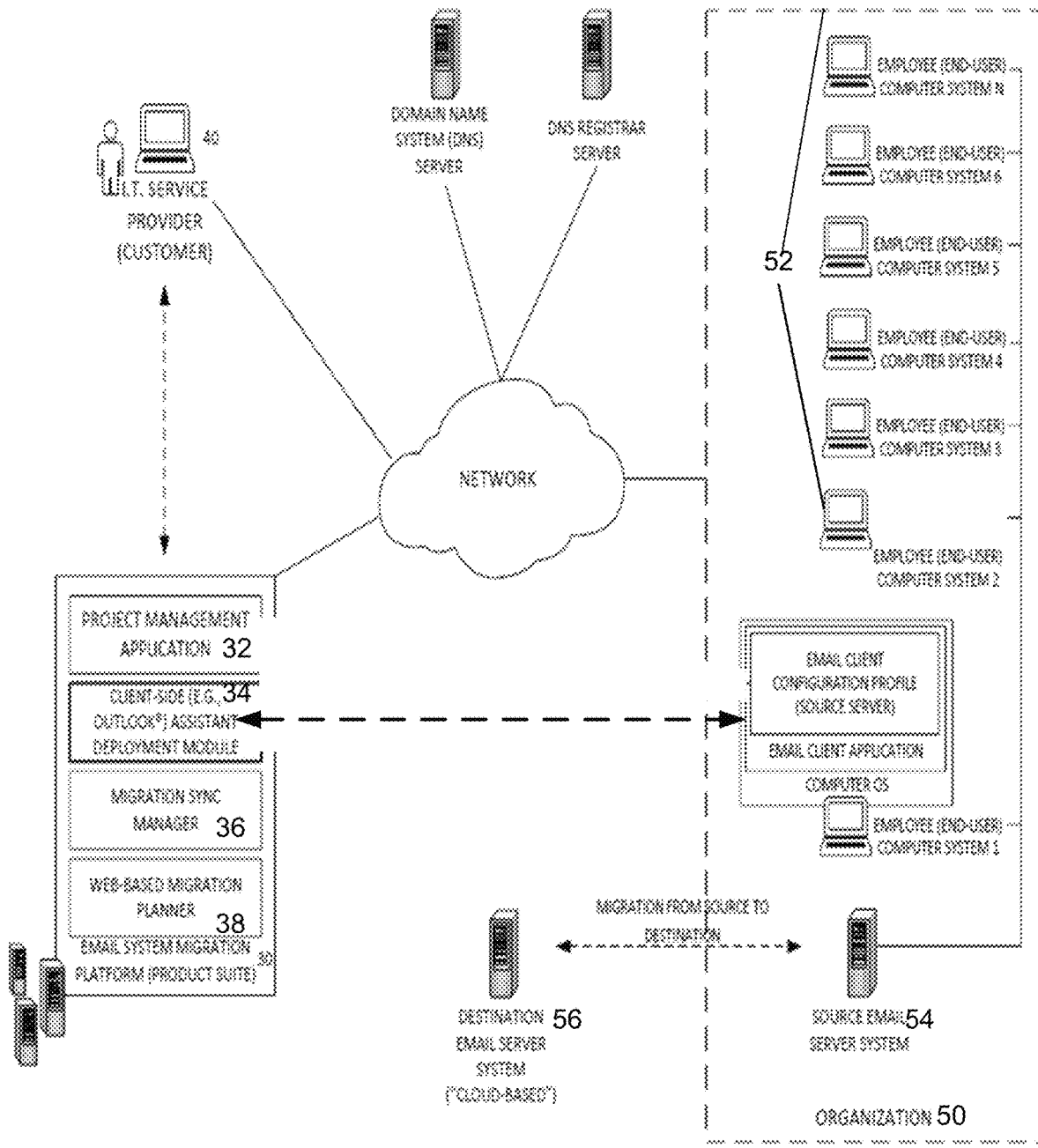
FIG. 2 is a block diagram illustrating an example of a computer network environment in which techniques, consistent with some embodiments, may be deployed.

FIG. 2 is a block diagram illustrating a computer network environment in which techniques, consistent with various embodiments, may be deployed. As illustrated in the computing environment of FIG. 2, an email system migration platform 30 (hereinafter, "migration platform") consists of a suite of integrated cloud-based and/or cloud-enabled products, including a web-based migration planner 38, a migration sync manager 36, a client-side assistant deployment module 34, a project management application 32, and/or any other components. In this example, the various components are designed to operate in conjunction with one another to provide an end-to-end solution for migrating email systems from one computer system to another. The migration platform 30 can thus be viewed as a cloud-based service that provides a customer with a set of tools for concurrently planning for, performing, and managing several email system migration projects, for different organizations, including large enterprises, as well as small- and medium-sized businesses.

The project management application 32 can be configured to provide a user interface to the customer associated with computer 40. For example, the interface provided by the project management application 32 for the customer may enable the customer to access various messages, alerts, issues, reports and/or any other documents generated during the migration process. The interface provided by project management application 32 can present the customer information regarding a progress of the migration process. In some examples, the workflow for migrating the email system may be specifically designed for the customer and the interface provided by the project management application 32 can present the customized workflow.

The client-side assistant deployment module 34 can be configured to deploy client-side assistants to the client computers, such as client computers 52-1 to 52-N within organization 50. In exemplary implementations, the client-side assistant deployment module 34 can be configured to use a remote software deployment mechanism (e.g., such as Windows Group Policy) to arrange for the automatic installation of the client-side assistant on the end-users' computers 52. In some other implementations, the client-side assistant deployment module 34 can be configured to generate an email to be sent to each end-user. The email can include instructions and/or a link (e.g., hyperlink) that will enable the end-user to download and install the client-side assistant to his or her computer system.

The migration sync manager 36 can be configured to synchronize user accounts on the source and destination systems. The synchronization performed by the migration sync manager 36 can include synchronizing a first user account on the source and destination systems. The first user account can include user information regarding a first user. The user information can include an user identification, password, real-world name, contact information, employee ID, age, gender, and/or any other type of user information. In exemplary implementations, the migration sync manager can be configured to duplicate the user information in the user account for the first user on the source system onto the user account for the first user on the destination system.

The web-based migration planner 38 can be configured to generate a migration plan for the customer based on inputs provided by the customer through a web client implemented on the computer 40. The user inputs provided by the customer through the web client can include information regarding source and/or destination systems. The web-based migration planner 38 can configured to analyze the obtained information and generate instructions to obtain more information to facilitate the migration. For example, the obtained information can include information indicating an address of the source system. Based on the address of the source system, the web-based migration planner 38 can generate instructions to interrogate the source system to acquire various information regarding the source system, such as system type, number of user accounts, number of active user accounts, just to name a few. Based on the user-provided and acquired information, the web-based migration planner 38 can generate a migration plan for the customer to review and to execute. Similar values can also be obtained from destination system by the web-based migration planner in a similar manner.

With various components of migration platform 30 having been generally described, an exemplary scenario is provided below to illustrate sever side operations for an email system migration process involving migration platform 30, client computers 52, source system 54 and destination system 56. The email system migration process can begin when the customer, using the client computing device 40, interacts with the web-based migration planner 38, for example, by providing information about the particular organization 50 on whose behalf the migration project is being performed, information about the particular source email system 54 that is being migrated from, and information about the destination email system 56.

In some embodiments, the migration platform 30 can use source system discovery algorithms to automatically identify and obtain information about the source email system 54. As such, at least with some embodiments, the web-based planner 38 may prompt the customer to provide only minimal information about the source email system 54, for example, such as an administrative account credential (e.g., username and password for an administrator of source system 54) for the customer to authenticate him/her-self. Using the provided account credentials, the source system discovery algorithms can use one or more email communication protocols to interrogate the source email system 54 and identify various information about the source system 54, including the system location (physical and virtual), the system type (e.g., Microsoft Exchange Server®, Lotus Notes®, Google Apps™, etc.), the primary communication protocol(s) that the system supports (e.g., Exchange Web Services, Web Distributed Authoring (WebDAV), Internet message access protocol (IMAP), post office protocol (POP), Google Data API', etc.), and the correct format of end-user credentials (e.g., usernames/passwords, etc.) for accessing the source system 54.

In certain embodiments, in addition to the interrogation initiated by the migration platform 30, an executable component or a server side assistant can be deployed to the source system 54 to perform various interrogation or querying routines to discover information about the source email system. In some instances, using this server side interrogation technique, information including email forwarding rules, distribution groups and corresponding members thereof, aliases, and other information about the source email 54 system can be discovered. While interrogating the server of the source email system 54, the server side assistant may generate a variety of alerts to notify the customer of potential, or in some instances, actual, issues that may arise during the email system migration project. For example, if the number of end-user mailboxes exceeds the number of end-user licenses for the destination email system, an alert may be generated. Similarly, if the size of a particular end-user's mailbox exceeds some known threshold, such that the mailbox cannot be migrated to the destination email system, an alert may be generated. Of course, a variety of other issues relating to the server side assistant may also cause alerts to be generated and presented via the interface provide project management application 32.

In some embodiments, other system settings and/or data can be discovered. For example, discovery algorithm can be configured into the web-based migration planner 38 or the server-side assistant to automatically discover current or existing domain name system (DNS) settings, such that, during the plan execution phase, the DNS settings can be automatically reconfigured, relocated or otherwise modified to operate with the destination email system. This may eliminate or minimize both the amount of manual activity required and the downtime during which an email system is not available to end-users.

As a result of the planning phase by the migration platform 30 as described above, a detailed migration plan can be established. In certain embodiments, the migration plan can include a set of workflows to be performed by a customer relationship management (CRM) system or engine, referred to herein as a "system workflow engine." With some embodiments, the system workflow engine may be a component of a third-party CRM system, adapted for use with the email system migration platform, but otherwise capable of executing various business workflows. However, in some embodiments, the system workflow engine may be a proprietary, custom-developed engine designed specifically for the project management application, and other specific components of the email system migration platform.

In any case, the system workflow engine can execute the migration plan by performing tasks defined by the various workflows that make up the migration plan. Information obtained and/or generated during the execution of various workflows may be stored in a data store, and presented via one or more user interfaces provided by the project management application 32. With server side operations for the email system migration process having been generally described, attention is now directed to the client-side operations that can be performed by a given client-side assistant once being deployed on a given end-user's computer system.

B. Operations Involving Client-Side Assistant

This section describes deployment and execution of client-side assistants on end-users' computers. The client-side assistant is a program component that can be configured to automatically configure email clients by generating configuration information after being deployed to end-users' computers. In the improved migration process described herein, the client-side assistant generates the configuration information instead of requiring the end-users to manually enter the configuration information. The deployment of the client-side assistants can be achieved through migration platform 30. An overview of the client-side assistant functionalities in the migration process is provided in detail below.

1. General Overview Of The Client-Side Assistant

As shown in FIG. 2, the migration platform 30 can deploy (or push) client-side assistant to individual client computers 52. For example, in some embodiments, the customer can use the web-based planner 38 to plan automatic deployment of the client-side assistant to each end-user's client computers 52. The web-based migration planner 32 can instruct the client-side assistant deployment module 34 to effectuate the deployment accordingly. For example, the client-side deployment module 34 can use a remote software deployment mechanism (e.g., such as Windows Group Policy) to arrange for the automatic installation of the client-side assistant on the end-users' computer systems 52. However, this is not necessarily the only case. In some examples, an email can be generated by the customer via the web-based migration planner 38 to each end-user. The email can contain a link where access to the client-side assistant is provided. After receiving the email, the end-user can download the client-side assistant.

However deployed, when executed at the end-user's client computer system 52, the client-side assistant can be configured to perform various tasks on the client computer system 52.

For example, the client-side assistant can perform various tasks to ensure that the end-user's client-side application experience with the destination system 56 is as similar as possible to the prior experience with source system 54. For instance, the client-side assistant may retain certain configuration settings or user preferences of the email client on the end-user's computer 52, such as address autocomplete settings, email signature settings, email notification download location, email notification frequency, calendar settings, task colors, and/or any configuration settings or user preferences.

The client-side assistant may perform various checks (e.g., performance or readiness checks) on the end-user's client computer 52 that may result in one or more alerts being generated. For instance, the client-side assistant may analyze an end-user's client computer 52 to assess what software (applications and operating system (OS), etc.), and particularly, which versions of software, are installed on the client computer 52. As the destination mail system 56 may require certain software specifications (e.g., OS version, software patches or service packs, application versions, and so forth) for the end-user client computer 52, to the extent that the client computer does not meet one or more specifications, an alert may be generated and displayed via the interface provided by the project management application 32.

As will be described in detail below, one of the many tasks performed by the client-side assistant is to generate new configuration information. The new configuration information can include values for appropriate configuration settings for use with the end-user's email client application (e.g., Microsoft Outlook®) and the destination system. In certain embodiments, the client-side assistant can perform various discovery routines to automatically obtain user information. For example, the client-side assistant can be configured to discover an user identification associated with the end-user on the client computer 52. In certain embodiments, the user identification can include a windows login ID, a domain user ID, and/or any other type user ID that is used by the end-user to log into the client system 52. The user identification obtained by the client side-assistant can be used to authenticate the end-user before the new configuration information is generated. However, this is not necessarily the only case.

In some embodiments, when executed on the end-user's computer system, the client-side assistant can prompt the end-user to provide a credential for authentication. The credential can be the end-user's credentials for logging into client computer 52, credentials for logging into source system 54 or destination system 56 and/or any other type of credentials. The client-side assistant can be configured to cause either source system or the destination system to validate the end-user's credentials. If the credentials is validated, the client-side assistant can proceed to perform other tasks for generating the new configuration information. However, there is no valid credentials on the client computer system 52, the client-side assistant may communicate information (e.g., a warning or error notification) to the migration platform 30 and/or the customer.

The client-side assistant can be configured to discover a user credential of the end-user for logging into the source system 54 or destination system 56. For instance, the to-be-discovered user credential can include a username and password pair. As described above, since user accounts on the source and destination systems have been synchronized, a particular end-user's credential for logging into the source system 54 can be used for logging that end-user into the destination system 56. Before including this credential in the new configuration information, the credential can be caused to be confirmed by the source system 54 or the destination system 56 first. This may involve submitting the user credential to the source system or the destination system for confirmation.

In some embodiments, the client-side assistant can use an application programming interface (API) to query an operating system of the end-user's computer 52 for the end-user's email credentials described above. One example of such an API is Credentials Manager—a service that is part of certain versions of the Microsoft Windows operating system. In alternative embodiments, the credentials discovery routine may "interrogate" a data structure stored in memory and managed by the operating system. In some embodiments, the client-side assistant may be configured to attempt discovery of the end-user's password using one technique (e.g., directing an API request to a service), and then if unsuccessful with the first technique, use a second technique (e.g., interrogate data structure in memory).

Figure 3:
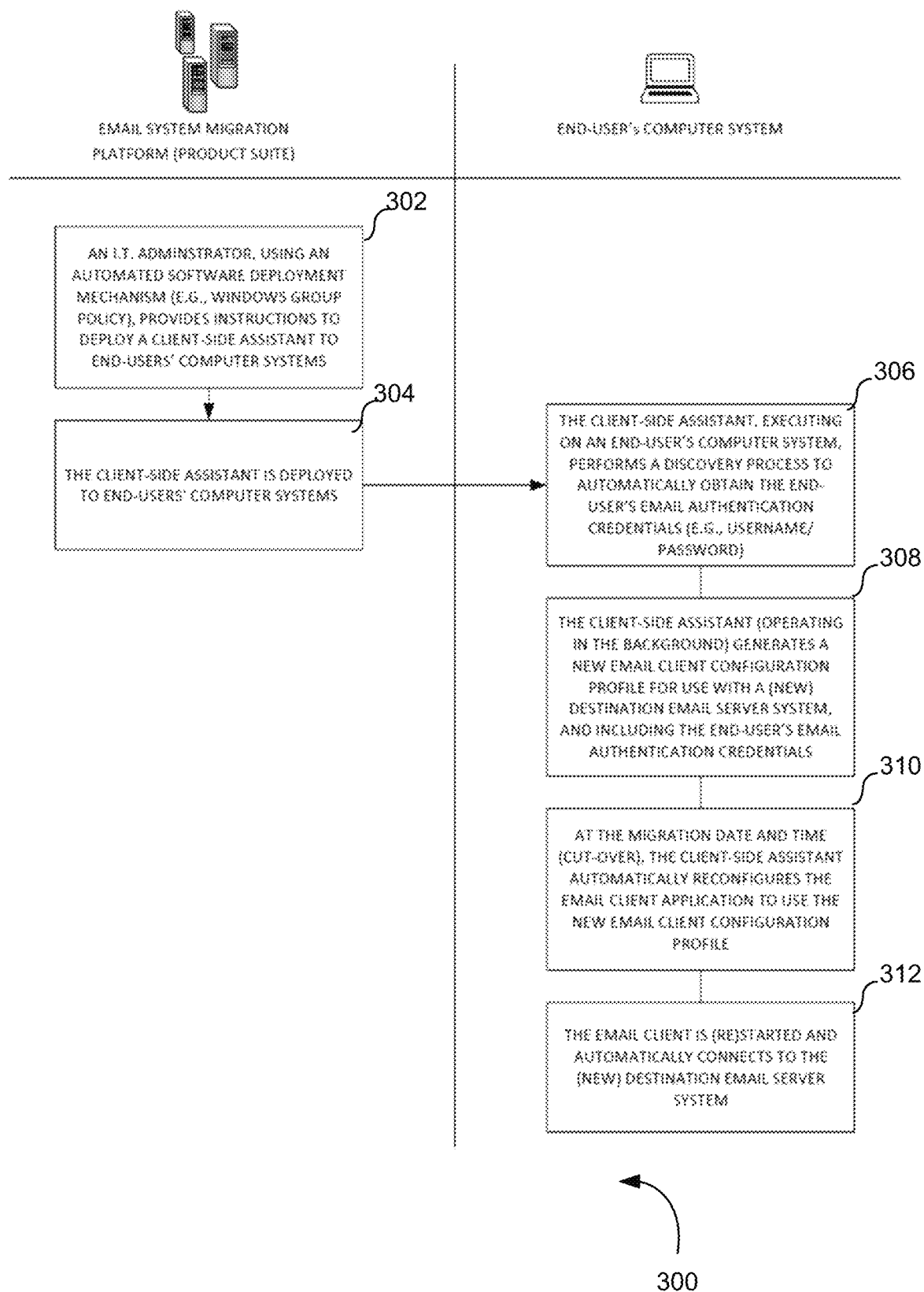
FIG. 3 is a flow diagram illustrating various operations performed as part of a method to configure an email client application during an email server system migration, consistent with some embodiments.
Figure 4:
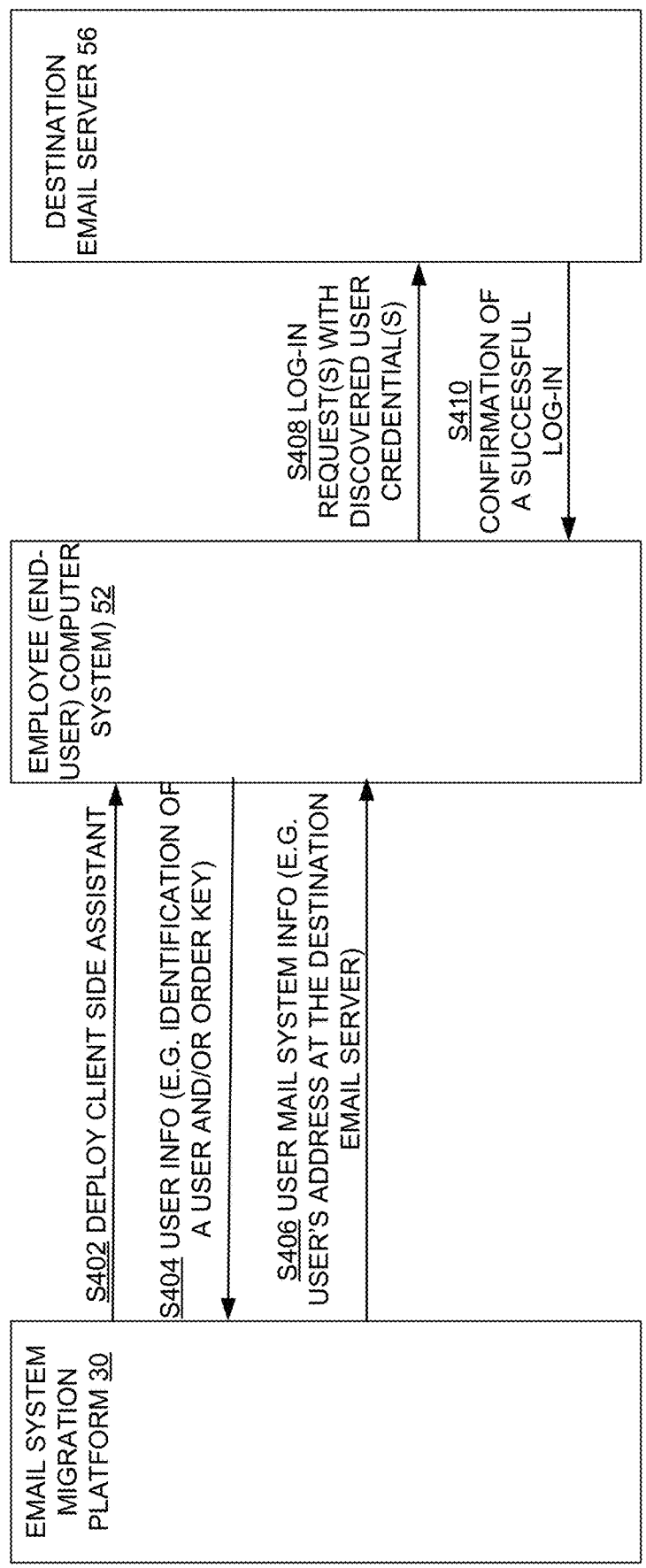
FIG. 4 is a block diagram showing information exchange between some of the components shown in FIG. 2.
Figure 5:
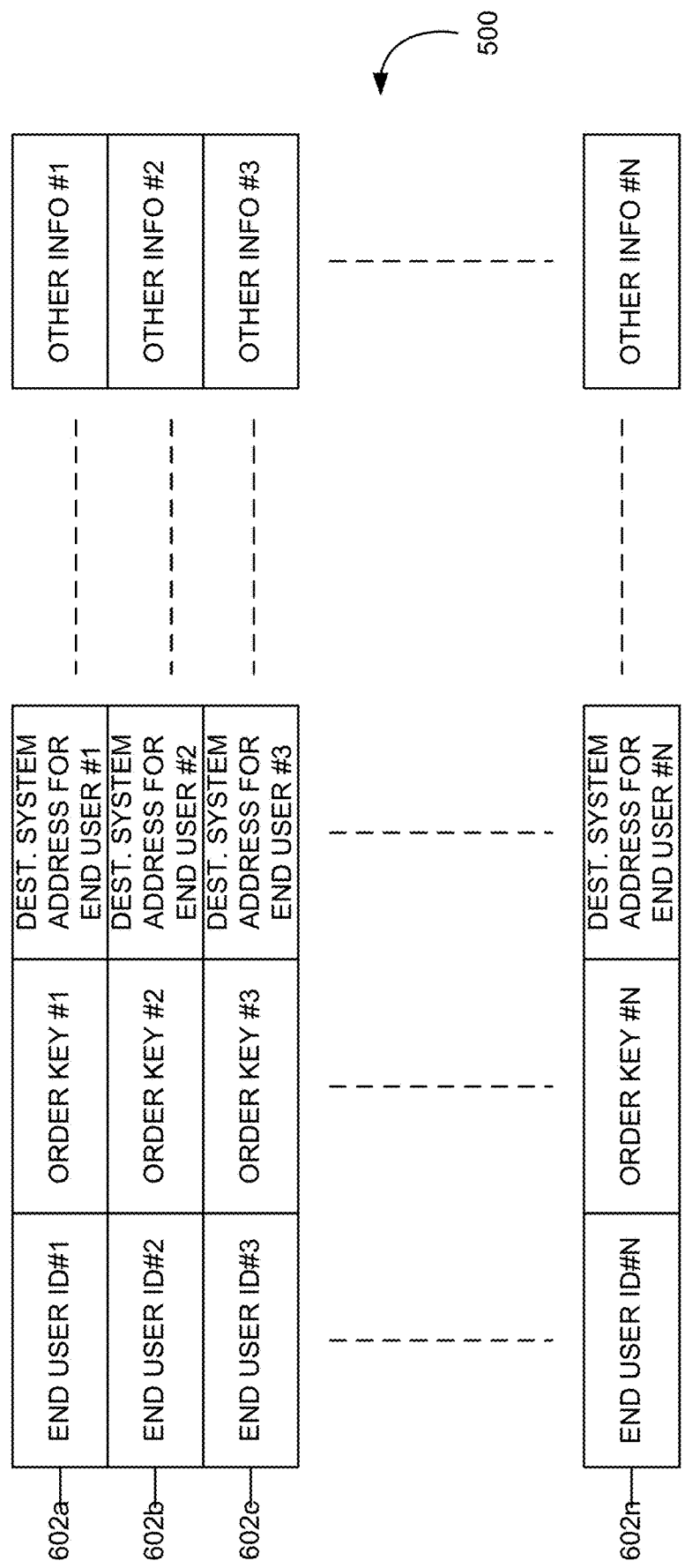
FIG. 5 schematically illustrates information that can be managed by the migration platform shown in FIG. 2.

With an overview of the functionalities of the client-side assistant having been described, attention is now directed to FIGS. 3-5, where details of some of the operations involving the client-side assistant during the migration process are provided.

2. Deploying and Executing Client-Side Assistant

Referring now to FIG. 3, a method 300 is shown for generating configuration information for migrating an email client from a source system to a destination system, consistent with some embodiments. Method 300 can begin with step 302 where a customer (e.g., an I.T. administrator) can specify, via the web-based planning tool provided by the migration platform 30, deploying client-side assistants to end-users' computers. For example, a customer may, via the web-based planning portal, designate or specify the end-user computing devices to which the client-side assistant is to be deployed. For instance, the customer may specify deploying client-side assistants to all end-users within an identity domain a company.

At step 304, client-side assistants can be deployed to end-users' client computers. In some exemplary implementations, a software deployment mechanism can be invoked to deploy the client-side assistants to the designated end-user computer systems 52. In some embodiments, particularly in a Microsoft® Windows® operating system environment, a feature referred to as Group Policy can be used to centrally manage and remotely deploy software applications—the client-side assistant in particular—to end-user computer systems 52. When the client-side assistants can be remotely deployed in this manner, the intervention of the end-user can reduced.

At step 306, in some embodiments, a given client-side assistant, once executed on a given end-user's computer 52 after being deployed, can perform a discovery routine to automatically obtain information regarding one or more end users associated with the given client computer 52. The user information to be discovered by the client-side assistant can include an identity associated with the end-user, a username/password pair credential for the end-user to log into the source system 54, an order key previously assigned to the client computer 52, and/or any other user information. The discovered user information can be used to locate user records, verifying the end-user's eligibility to be migrated to the destination system 56, and/or for any other purpose.

Once the end-user's record is located, destination system information regarding the end-user can be retrieved and transmitted to client-side assistant for generating the new configuration information. The new configuration information can include user credential for logging into the destination system, which can be obtained from the client computer 52 when the user credential for logging into the source system is stored at the client computer 52. As mentioned above, the source and destination systems are synchronized so the user credential for the end-user to log into the source system 54 can be used to for the end-user to log into destination system 56. However, before including such a user credential in the new configuration information, the client-side assistant can cause the destination system or the source system to confirm the user credential is valid first.

At step 308, after the user credential is confirmed being as valid, the client side-assistant can proceed to generate new configuration information for connecting the email client on the client computer 52 to the destination system automatically and persistently. The new configuration information can include the destination system information regarding the end-user received at step 306. For example, the new configuration information can include an address of the destination system, an identification, e.g., username, of the end user's account on the destination system, a connection protocol, a server proxy address, a user credential, e.g., password, for the end-user to log into the destination system. In some exemplary implementations, the new configuration information includes a email client profile, which can be used by the email client to connect to destination system automatically and persistently.

At step 310, after the new configuration information is generated at the end-user's client computer system 52, the client-side assistant can be continued to be execute in the background. At the time of the migration cutover, the client-side assistant can be configured to automatically configure the email client to use the new configuration. In some embodiments, the client-side assistant may be pre-configured with the cutover date and time, such that, the client-side assistant will automatically configure the email client application to use the new configuration information at the pre-configured date and time. Alternatively, the client-side assistant may periodically request information, such as the cutover date and time, from the migration platform 30, or, receive the information from the migration platform 30.

At step 312, however the cutover date and time are received by the client-side assistant, at the appropriate time, the client-side assistant can restart the email client application, which will then automatically connect to the destination email server system, consistent with the configuration settings of the new profile. As such, with some embodiments, the end-user will encounter no interruption to his or her email service, and will not be required to take any action to configure his or her email client application to operate with the (new) destination email server system.

In some embodiments, limited interaction by the end-user may be needed. For example, in some embodiments, the client-side assistant may be deployed by requesting, in an email, that the end-user download and install the client-side assistant. The end-user may be prompted by the client-side assistant to provide his or her end-user credentials when the client-side assistant having been downloaded by the end-users. In such instances, the end-user credentials that are discovered by the credentials discovery routine may be compared with the end-user provided credentials. An example of such a method is illustrated in FIG. 4.

Attention is now is directed to FIG. 4, where exemplary information flow between the migration platform 30, client computer 52, and destination system 56 is illustrated.

As shown, at S402, the client-side assistant can be deployed or pushed to the client computer 52 from the migration platform 30. As described above, in certain embodiments, this can be done by the client-assistant deployment module 34.

At S404, the client-side assistant can send user information to the migration platform 30 to match the user information with a user record maintained by the migration platform 30. The user information sent by the client-side assistant can include a windows ID of the end-user, an employee ID of the end-user, and/or any other type of the user identification that can be used to uniquely identify the end-user. The obtained user information can be used to locate a record of user and to determine whether the user identified by the obtained user information is eligible to use client-side assistant to create new configuration information for migration to the destination system 56.

In some examples, the client-side assistant may send user information regarding multiple users associated with the a single client computer 52. In those examples, the user information sent by the client-side assistant can be parsed. In certain embodiments, order keys can be pre-created and assigned to individual client computers 52. In those embodiments, the client-side assistant can be configured to obtain the order keys when executed on the computers 52 and send the order keys to the migration platform 30 for verification along with other user information obtained from the client computers 52.

At S406 destination system information regarding the user identified by the user information sent at S404 can be sent from migration platform 30 to client computer 52. The destination system information regarding the end-user can include information indicating an email address of the end-user on the destination system 56, information indicating a cache mode, server connection point value from the destination system 56, proxy address for destination system 56, information indicating an email address of the end-user on the source system 54, an email protocol used by the source system 54, and/or any other information. Some or all of the information sent at S406 can be included in the new configuration information generated by the client-side assistant.

At S408, log-in requests are sent by the client-side assistant to the destination system 56. As mentioned above, before generating the configuration information, the client-side assistant can discover and obtain user credential on the client computer 52 for logging into the source system 54. Since user accounts are synchronized between the source and destination systems, this user credential can also be used to connect to the destination system and thus can be included in the new configuration information generated by the client-side assistant. As part of the new configuration generation process, the client-side assistant can first verify whether this discovered credential on the client computer 52 is valid by submitting the credential to the destination system 56 to have the destination system 56 confirm it. It should be understood in some other examples, the credential confirmation operations described at S408 can be done at source system 54.

At S410, a confirmation of successful log-in can be sent from the destination system to the client computer 52.

FIG. 5 illustrates an example of user information 500 that can be maintained by a server such as migration platform 30 or an ordering system. The information 500 can be used to facilitate generation of configuration information by the client-side assistant on client computers 52. As shown, at the server, an identification of an end-user can be associated with an order key, mail box information on the destination system such as destination email address for the end-user, mail box size limit, mail download options, and/or any other information. The individual end-user records 502a-n can be matched with the user information sent by the client-side assistant. For example, the user information sent by the client-side assistant can indicate a specific user identification. The specific identification can then be looked up through records 502a-n in the user identification information column. Upon a match, appropriate destination system information, such as an username of the end-user on the destination system, an email address of the end-user on the destination system and/or any other destination system information for the user identified by the user information sent by the client-side assistant can be retrieved and pushed to the client computer 52. The order key can be used to verify if a given end-user is eligible to use the client-side assistant.

Figure 6:
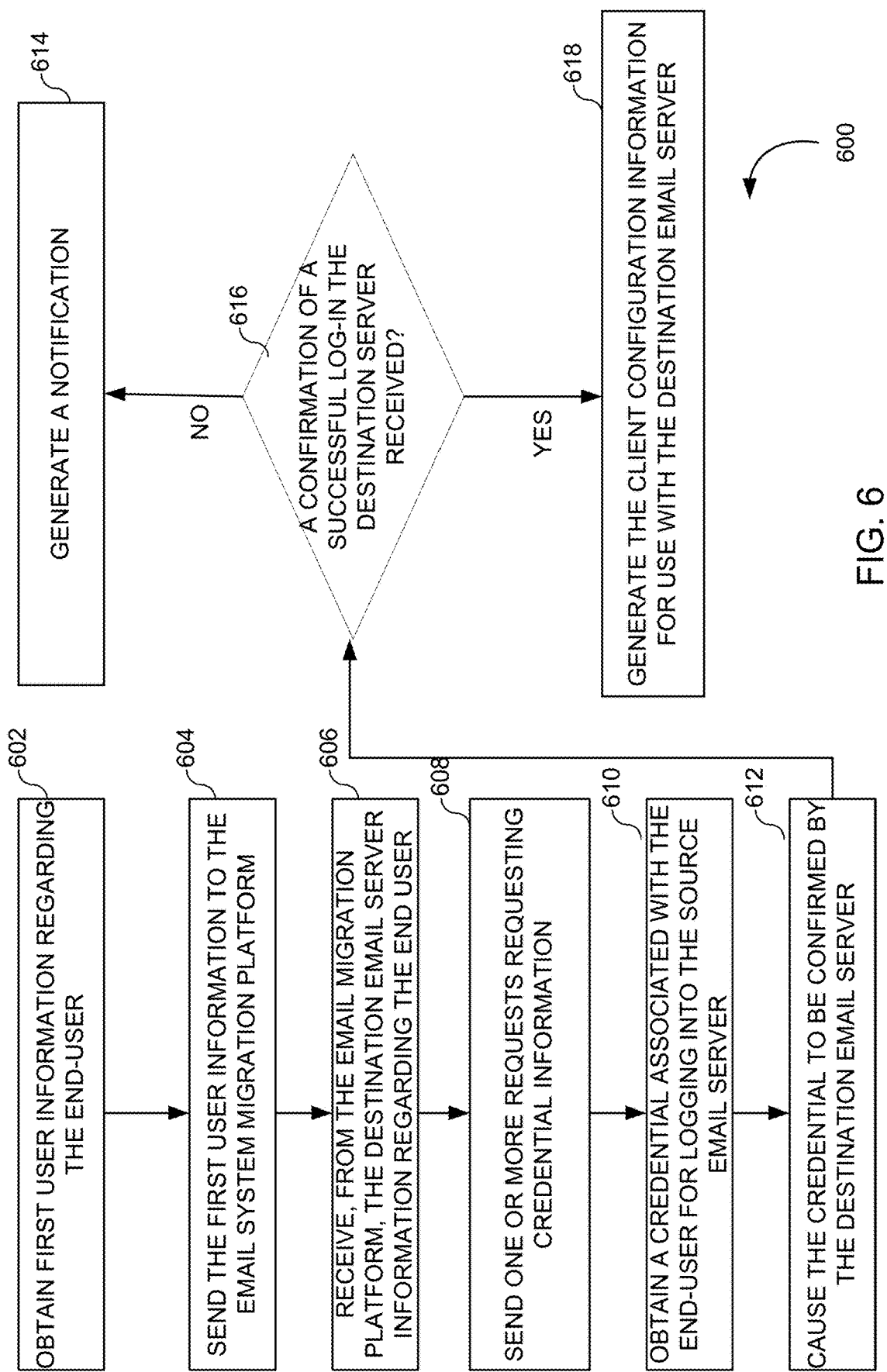
FIG. 6 illustrates an exemplary method of automatically configuring an email client application in accordance with one embodiment of the disclosure.

With the operations involving client-side assistant during the migration process having been generally described, attention is now directed to FIG. 6 where specific operations in accordance for generating new configuration information on a end-user's client computer 52 are provided.

3. Generating New Configuration Information

FIG. 6 illustrates an exemplary method 600 that can be performed by the client-side assistant after being deployed on a client computer in accordance with one embodiment of the disclosure. Operations described in FIG. 6 correspond to steps 306 and 307 illustrated in FIG. 3.

At a step 602, information regarding a first user can be discovered from the client computer 52. It should be understood although in most cases, only one end-user is associated with a particular client computer 56, this is not necessarily the only case. In certain situations, a client computer 52 can be associated with more than one end-user. For example, the client computer 52 may be a shared computer in a school lab, and multiple staff members can have access to and user accounts on client computer 52. Therefore, the client-side assistant in accordance with the disclosure can be configured to set up automatic migration for multiple end-users on any given client computer 52 as long as these end-users are eligible (eligibility can be established by assigning an order key to a particular end-user through an email and have the end-user download the order key to his/her user accounts on the client computer 52).

In any case, the information regarding the first user can include an identity of the first user. As mentioned above, when deploying the client-side assistants to the client computers 52, the customer is not required to specify individual end-users in the deployment. For example, the end-user can simply specify deploying the client-side assistants to all end-users' computers in an identity domain. Thus, the client-side assistant when executed on the client computer after the deployment, may need to identify the first end-user on the client computer 52. In some exemplary implementations, an identification of the first end-user on client computer 52 can be discovered from client computer 52. For example, a username associated with the first user in an identity domain can be discovered from client computer 52, e.g., johndoe@domain.com, by querying an operating system of the client computer 52. In some exemplary implementations, the client-side assistant can be configured to query Windows account manager for obtaining such information. It should be understood this is not intended to be limiting. User identification for identifying the first user associated with the client computer 52 is not necessarily limited to a username in an identity domain. In some other examples, it can be a username associated with the first user on a source email system, on a particular service server provided for employees within an identity (e.g., a cloud ID), or any other type of user identification.

As mentioned above, in some embodiments, the user information discovered at step 602 can include a digital order key previously assigned to the first user. In those embodiments, as part of the migration process, the digital order key can be, for example, emailed to the first user or downloaded by the first user in advance of the deployment of client-side assistant. The order key can be used as a verification tool to confirm the first user's eligibility to be migrated from source system 54 to destination system 56.

At a step 604, the user information discovered at step 602 can be sent to migration platform 30. As described at S504 in FIG. 5, the user information discovered at step 602 can be used to locate a user record regarding the first user. The discovered user information can be examined by the migration platform 30 or can be forwarded to an ordering system. A first user record can located based on the first user identification included in the first user information discovered at step 602. An example of user records that can be maintained by the migration platform 30 or the ordering system is provided in FIG. 6.

At step 606, destination system information regarding the first user can be received by the client-side assistant. As mentioned at S506, the destination system information regarding the first user can include information indicating an account of the first user on the destination system 56, information indicating a cache mode, server connection point value from the destination system 56, proxy address for destination system 56, information indicating an email address of the end-user on the source system 54, an email protocol used by the source system 54, and/or any other information. The information indicating an account of the first user on the destination system 56 can include information indicating a username, an email address, an account identification number, and/or any other type of account information.

At a step 608, one or more requests requesting credential information associated with the first user can be sent by the client-side assistant. As mentioned above, the credential information can include a username/password pair for the first user to log into the source system 54. In some exemplary implementations, the client-side assistant can be configured to query an operating system of the client computer 52 to obtain the credential information. For example, the client-side assistant can be configured to make a call to Credential Manager in a Microsoft® Windows® operating system. Windows Credential Manager is a program component that stores user log-in credentials, such as usernames and passwords, for other computers on a network, servers or Internet locations such as websites. In some examples, the Windows Credential Manager can store user credential(s) for logging into the source system 54.

In the event that client computer 52 does not have Windows Credential Manager or user credentials for logging into the source system 54 is not stored by the Windows Credential Manager, the client-side assistant can be configured to make another request to one or more applications installed on the client computer 52 to obtain the credential information. For example, the client-side assistant can be configured to obtain the user credential information by having another application "interrogate" a particular data structure stored in memory locations and managed by the operating system. In that example, data potentially representing user credential information can be obtained from the memory locations. The data can then be analyzed to determine whether user credential information is included. In exemplary implementations, the client-side assistant can be configured to determine whether to use a 32 bit or 64 bit version of the application. /

At step 610, a credential for the first user to log into the source system 54 can be obtained from the credential information obtained at step 608. The credential information obtained at step 608 can include many different credentials for logging into different systems.

For example, the credential information obtained at step 610 may include a "blob" of user credential information. At step 610, the client-side assistant can be configured to examine the user credential information and extract a user credential that can be used to log into the source system 54. In some exemplary implementations, the client-side assistant can be configured to look for a user credential that contains a string indicating an address of the source system 54.

At step 612, the client-side assistant can be configured to cause the destination system 56 to confirm the user credential obtained at step 610. This may involve submitting the user credential to the destination system 56 and have the destination system 56 authenticate the first user using the submitted user credential. In some implementations, the client-side assistant may try determining whether the credential information obtained at step 610 has a valid credential that can be used for logging into the destination system. In those implementations, the client-side assistant can be configured to have the destination system confirm a user credential in the credential information by submitting user credential in the user credential information one at a time until a user credential is either confirmed by the destination system 56 or until all user credentials in the user credential information are exhausted. In exemplary implementations, the client-side assistant can submit user account information obtained at step 606 along with the user credential to be confirmed to the destination system 56. The user account information can include a username of the first user on the destination system 56 or an email address of the first user on the destination system 56. With such user account information, the destination system can confirm the user credential submitted. It should be understood in some other examples the operations described at step 612 can be performed at the source system 54. That is, in those examples, the client-side assistant can cause the source system 54 to validate whether the client computer 52 has a valid user credential for logging into the source system 54.

At step 616, a determination whether a user credential is confirmed by the destination system 56 can be made. If a confirmation is determined to having been received at step 616, method 600 will proceed to generate new configuration information for use with the destination system at step 616. The new connection configuration information can be created and populated with the destination system information received at step 606. For example, the new configuration information can include a name of the destination system 56, an address of the destination system 56, a user credential for logging into the destination system 56 that has been confirmed by the destination system 56, and/or any other information. If a confirmation is not received at step 616, method 600 will proceed to issue a notification. For example, an alert to the customer (e.g., system administrator) can generate to indicate configuration information is not generated for the first user due to invalid or no user credential discovered on client computer 52. Such a notification can serve as a message to notify the customer to take appropriate measure to resolve the issue.

In some implementations, at step 616, the client-side assistant can be configured to receive various destination system information from the destination system 56 after the user credential is confirmed by the destination system. For example, destination system can return the server connection point value for the new mailbox for the first user on the destination system, and proxy address for the new mailbox system. This information can be compared to corresponding values in the destination system information received from the migration system 30 at step at 606. If these do not match, then the client-side assistant will not proceed to generate new configuration information for migrating the email client on the client computer 52 to the destination system 56. The mismatch may be a result of a change in the mail system since the information was sent to the client or it may be a result of an incorrect network configuration leading the client-side assistant to communicate with the wrong mail server. After the client-side assistant informs the migration system 30, of the mismatch, an attempt can be made to retrieve the latest server connection point value for the new mailbox and proxy address for mailbox system and an alert can be raised indicating an issue to be resolved.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

III. Computer System

Any of the computer systems mentioned herein may utilize any suitable number of subsystems. Examples of such subsystems are shown in FIG. 8 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

Figure 7:
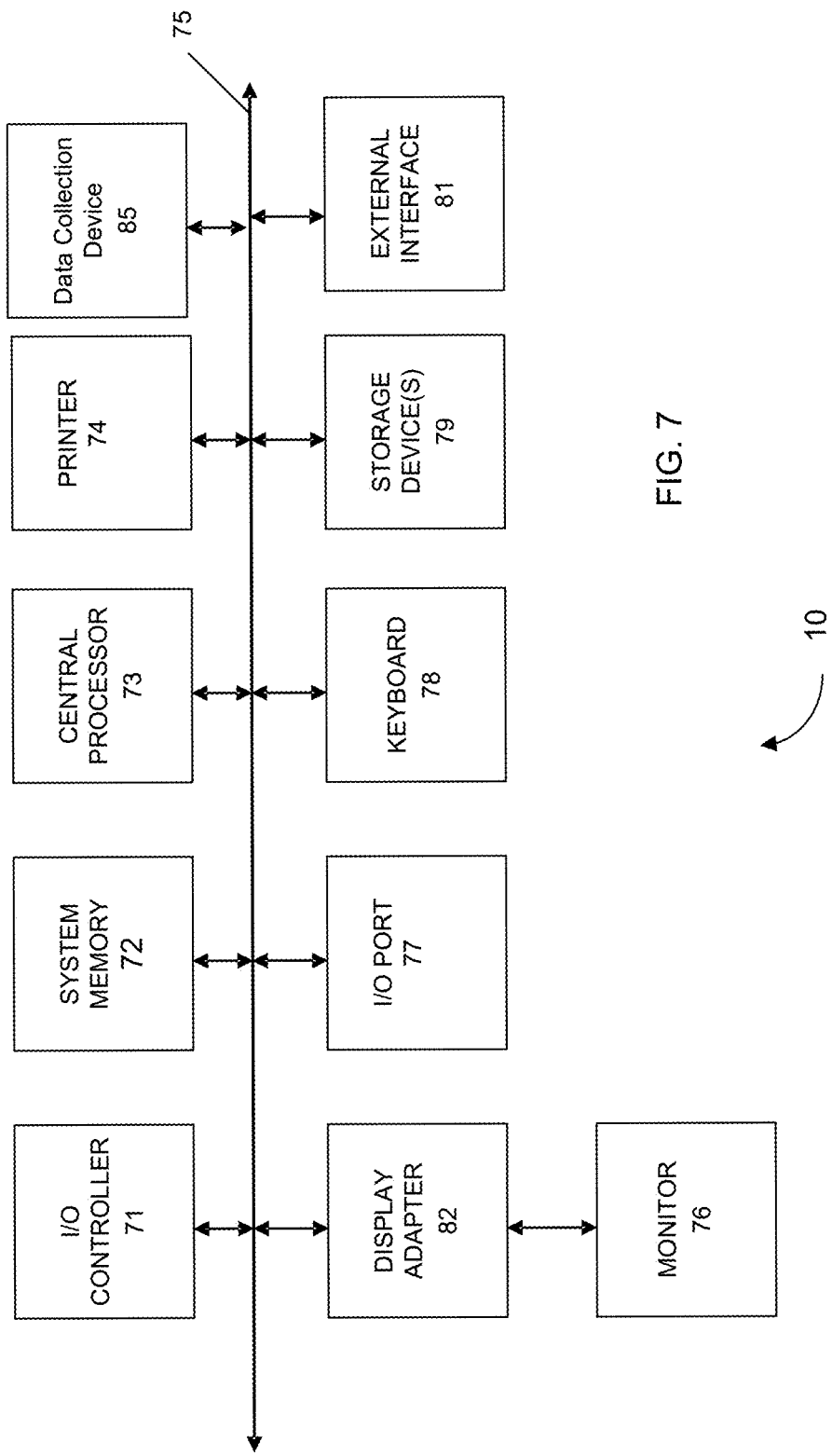
FIG. 7 is a block diagram of a machine in the form of a computing device within which a set of instructions, for causing the machine to perform any one or more of the methodologies discussed herein, may be executed.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to various embodiments may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner. However, other embodiments may be directed to specific embodiments relating to each individual aspect, or specific combinations of these individual aspects.

The above description of exemplary embodiments has been presented for the purposes of illustration and description. It is not intended to be exhaustive or to limit the invention to the precise form described, and many modifications and variations are possible in light of the teaching above. The embodiments were chosen and described best explain principles and their practical applications.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A computer-implemented method for facilitating electronic mail clients to migrate from a first source system to a first destination system, the electronic mail clients including a first electronic mail client being executed on a first computing system, wherein a mail assistant application is also being executed on the, first computing system, the method comprising:

obtaining, by the mail assistant application, first user information regarding a first user that is using the first computing system, the first user information including an identification associated with the first user;

sending, by the mail assistant application, the first user information to a remote computer, wherein the remote computer is separate and distinct from the destination system;

receiving, at the mail assistant application from the remote computer, first destination system information regarding the first user, the first destination system information indicating an account of the first user at the first destination system;

sending, by the mail assistant application, one or more requests to receive user credential information;

obtaining, by the mail assistant application, a credential associated with the first user for logging into the first source system based on received credential information;

causing, by the mail assistant application, the credential to be confirmed by a logging into the first destination system or the first source system using the credential and the account of the first user at the first destination system;

after a confirmation of the credential, generating, by the mail assistant application, first configuration information for automatically connecting the first electronic mail client to the first destination system;

effectuating, by the mail assistant application, the connection of the first electronic mail client to the first destination system using the first configuration information;

receiving, at the mail assistant application from the remote computer, information regarding the first user, the information indicating an address of the first user at a second destination system;

causing, by the mail assistant application, the credential to be confirmed by a logging into the second destination system using the credential and the address of the first user at the second destination system;

after a confirmation of the credential, generating, by the mail assistant application, second configuration information for automatically connecting the first electronic mail client to the second destination system;

effectuating, by the mail assistant, the connection of the first electronic mail client to the first destination system using the second configuration information;

obtaining, by the mail assistant application, an order key associated with the first user; and sending the order key to the remote computer for verification.

2. The method of claim 1, further comprising synchronizing user accounts between the first source and first destination systems such that the credential for the first user to log into the first source and the first destination systems are the same.

3. The method of claim 1, wherein the credential associated with the first user for logging into the first source system includes a user password.

4. The method of claim 1, wherein the first configuration information includes a signature associated with the first user, a preference of the first user, an address of the destination system, and/or the credential associated with the first user.

5. The method of claim 1, wherein the credential associated with the first user for logging into the first source system is obtained from a memory location in the first computing platform.

6. The method of claim 1, wherein the connection of the first electronic mail client to the first destination system using the first configuration information is effectuated at a specific date and time.

7. A system for facilitating electronic mail clients to migrate from a first source system to a first destination system, the electronic mail clients including a first electronic mail client being executed on a first computing system, wherein a mail assistant application is also being executed on the, first computing system, the system comprising a processor configured by machine-readable instructions to cause the system to perform:

obtaining first user information regarding a first user that is using the system, the first user information including an identification associated with the first user;

sending the first user information to a remote computer, wherein the remote computer is separate and distinct from the system;

receiving first destination system information regarding the first user, the first destination system information indicating an account of the first user at the first destination system;

sending one or more requests to receive user credential information;

obtaining a credential associated with the first user for logging into the first source system based on received credential information;

causing, by the mail assistant application, the credential to be confirmed by a logging into the first destination system or the first source system using the credential and the account of the first user at the first destination system;

after a confirmation of the credential, generating, first configuration information for automatically connecting the first electronic mail client to the first destination system;

effectuating the connection of the first electronic mail client to the first destination system using the first configuration information;

receiving, at the mail assistant application from the remote computer, information regarding the first user, the information indicating an address of the first user at a second destination system;

causing, by the mail assistant application, the credential to be confirmed by a logging into the second destination system using the credential and the address of the first user at the second destination system;

after a confirmation of the credential, generating, by the mail assistant application, second configuration information for automatically connecting the first electronic mail client to the second destination system;

effectuating, by the mail assistant, the connection of the first electronic mail client to the first destination system using the second configuration information;

obtaining, by the mail assistant application, an order key associated with the first user; and sending the order key to the remote computer for verification.

8. The system of claim 7, wherein the processor is further configured to cause the system to perform synchronizing user accounts between the first source and first destination systems such that the credential for the first user to log into the first source and the first destination systems are the same.

9. The system of claim 7, wherein the credential associated with the first user for logging into the first source system includes a user password.

10. The system of claim 7, wherein the first configuration information includes a signature associated with the first user, a preference of the first user, an address of the destination system, and/or the credential associated with the first user.

11. The system of claim 7, wherein the credential associated with the first user for logging into the first source system is obtained from a memory location in the first computing platform.

12. The system of claim 7, wherein the connection of the first electronic mail client to the first destination system using the first configuration information is effectuated at a specific date and time.

13. A non-transitory computer-readable medium storing computer-executable code for facilitating electronic mail clients to migrate from a first source system to a first destination system, the electronic mail clients including a first electronic mail client being executed on a first computing system, wherein a mail assistant application is also being executed on the, first computing system, the non-transitory computer-readable medium comprising:

code for obtaining first user information regarding a first user that is using the first computing system, the first user information including an identification associated with the first user;

code for sending the first user information to a remote computer, wherein the remote computer is separate and distinct from first computing system;

code for receiving first destination system information regarding the first user, the first destination system information indicating an account of the first user at the first destination system;

code for sending one or more requests to receive user credential information;

code for obtaining a credential associated with the first user for logging into the first source system based on received credential information;

code for causing, by the mail assistant application, the credential to be confirmed by a logging into the first destination system or the first source system using the credential and the account of the first user at the first destination system;

after a confirmation of the credential, code for generating first configuration information for automatically connecting the first electronic mail client to the first destination system, wherein the first electronic mail client is being executed on the first computing system;

code for effectuating the connection of the first electronic mail client to the first destination system using the first configuration information;

code for receiving, at the mail assistant application from the remote computer, information regarding the first user, the information indicating an address of the first user at a second destination system;

code for causing, by the mail assistant application, the credential to be confirmed by a logging into the second destination system using the credential and the address of the first user at the second destination system;

code for after a confirmation of the credential, generating, by the mail assistant application, second configuration information for automatically connecting the first electronic mail client to the second destination system;

code for effectuating, by the mail assistant, the connection of the first electronic mail client to the first destination system using the second configuration information;

code for obtaining, by the mail assistant application, an order key associated with the first user; and code for sending the order key to the remote computer for verification.

14. The non-transitory computer-readable medium of claim 13, further comprising code for synchronizing user accounts between the first source and first destination systems such that the credential for the first user to log into the first source and the first destination systems are the same.

15. The non-transitory computer-readable medium of claim 13, wherein the credential associated with the first user for logging into the first source system includes a user password.

16. The non-transitory computer-readable medium of claim 13, wherein the first configuration information includes a signature associated with the first user, a preference of the first user, an address of the destination system, and/or the credential associated with the first user.

* * * * *